Figure 1:
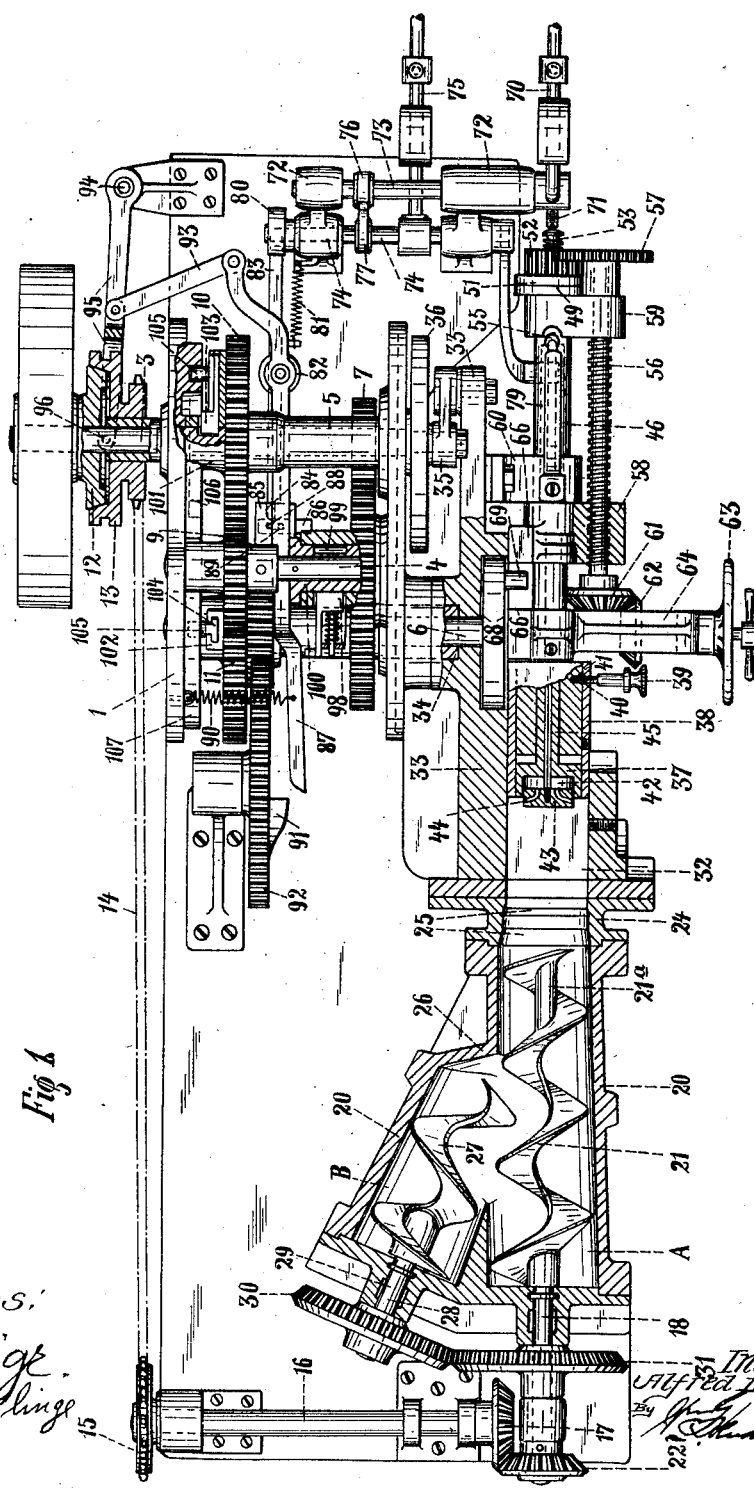

A. LUTZE.
MACHINE FOR TREATING AND MOLDING PLASTIC MASSES.
APPLICATION FILED SEPT. 17, 1909.

997,199.

Patented July 4, 1911.

3 SHEETS—SHEET 1.

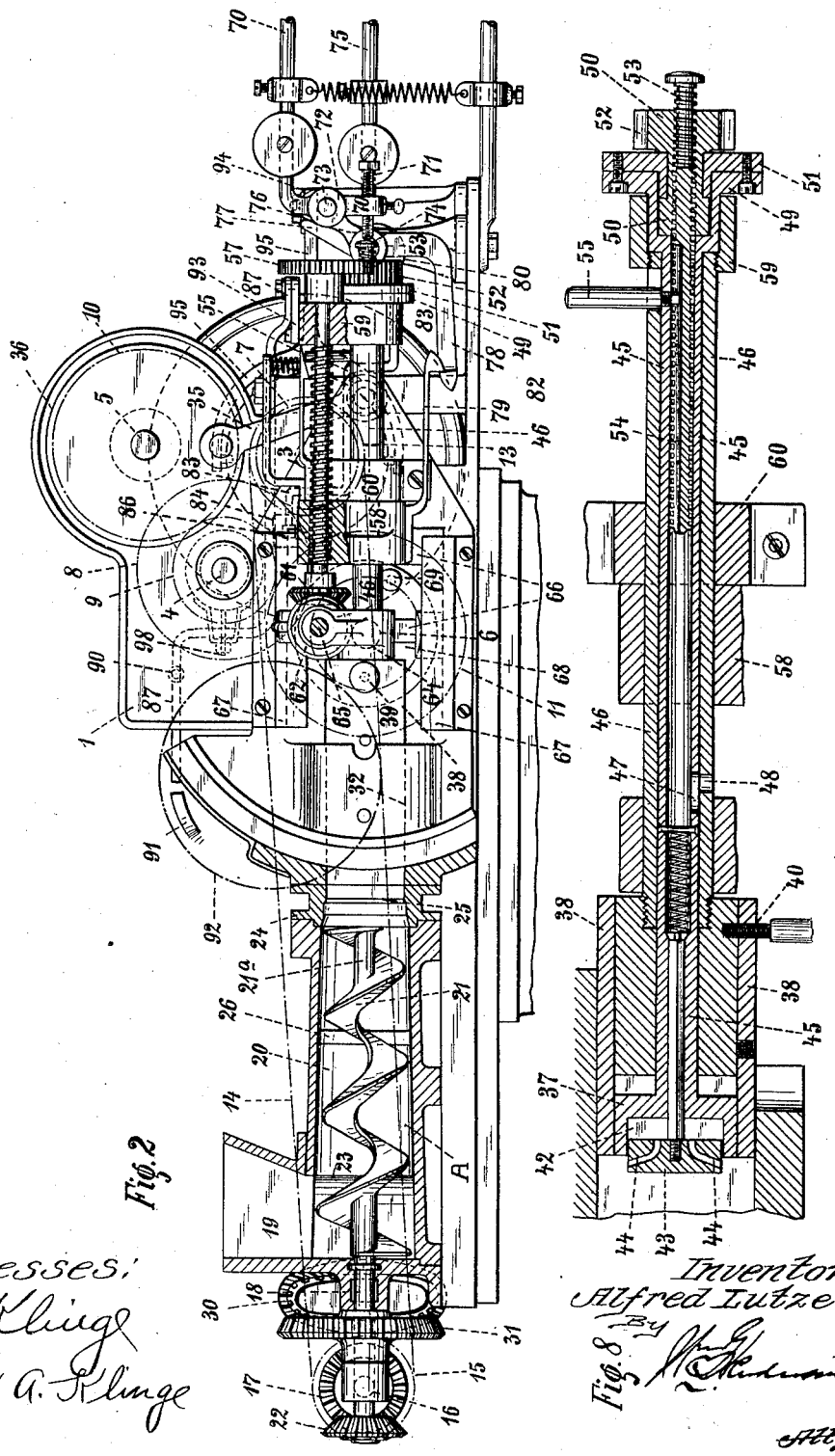

A. LUTZE.
MACHINE FOR TREATING AND MOLDING PLASTIC MASSES.
APPLICATION FILED SEPT. 17, 1909.
997,199.
Patented July 4, 1911.
3 SHEETS—SHEET 3.
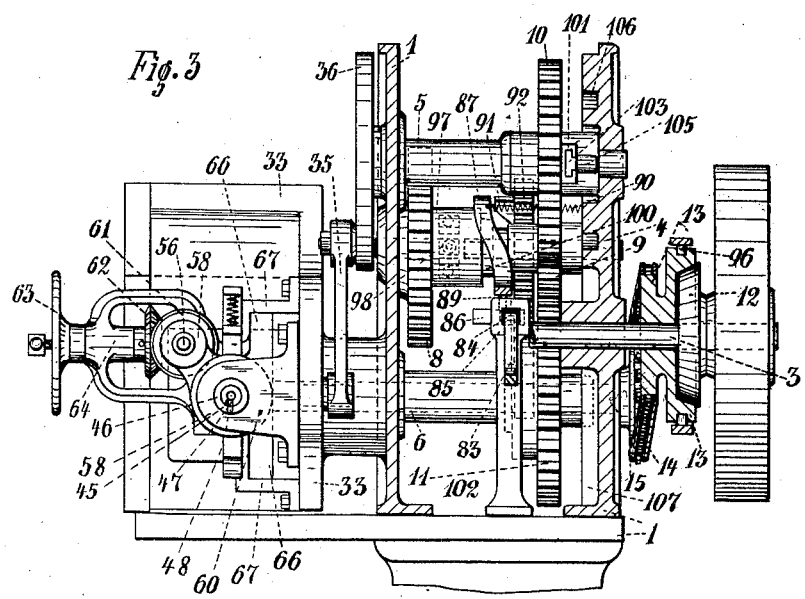
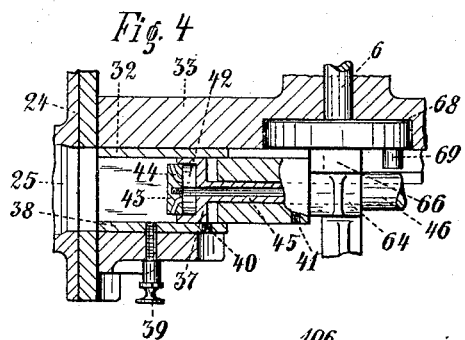
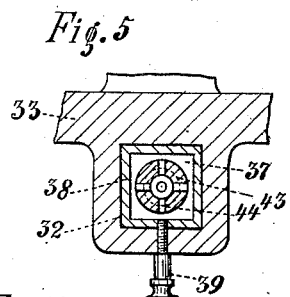
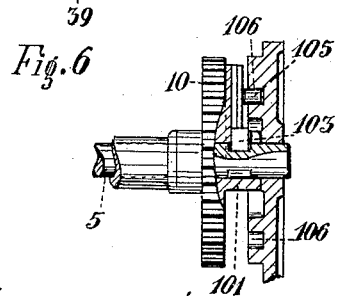
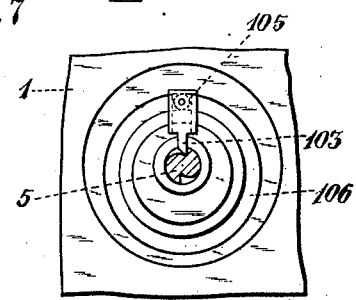
Witnesses:
Inventor
Alfred Lutze

UNITED STATES PATENT OFFICE.

ALFRED LUTZE, OF HALLE-ON-THE-SAALE, GERMANY.

MACHINE FOR TREATING AND MOLDING PLASTIC MASSES.

997,199. Specification of Letters Patent. Patented July 4, 1911.

Application filed September 17, 1909. Serial No. 518,253.

*To all whom it may concern:*

Be it known that I, ALFRED LUTZE, a subject of the Emperor of Germany, residing at 45ᶠ Merseburgerstrasse, Halle-on-the-Saale, Germany, manufacturer, have invented certain new and useful Improvements in Machines for Treating and Molding Plastic Masses, of which the following is a specification.

This invention relates to a machine for treating, dividing and molding plastic masses such as dough, butter and the like.

The characteristic features of the invention are firstly, the connection of two worms of different length, rotating in a casing, with an oscillating mold, by means of a tapering mouthpiece which communicates with the casing, secondly, the connection of a movable piston or plunger, which forms the bottom of said mold, on the one hand with a weight which exerts pressure on the plunger and with a lever mechanism coöperating with the weight and with the gearing of the machine, and on the other hand with two crank disks interposed in the gearing, in such a manner, that the mass charged into the worm casing is thoroughly agitated and is then forced, while being gradually compressed by the longer worm, which at one end is provided with a core, 21ᵃ, into the mold, after which, on an excess of pressure taking place, the plunger or bottom of the mold moves to the rear, and so actuates the weight which acts on the plunger, and the lever mechanism connected therewith, as to cause the gearing for the worms to be thrown out of action, while the crank gearing is thrown into operation, whereby the mold carrier is oscillated and finally the molded mass, previously formed in the mold, is ejected by the plunger, when the latter advances.

In the drawings one form of a machine according to this invention is illustrated by way of example.

Figure 1. is a top plan view thereof, partly in section. Fig. 2. is a lateral elevation partially in section. Fig. 3. is a cross sectional view, and, Figs. 4 to 8. illustrate details.

Journaled in the frame of the machine, which rests on a bedplate or table, are four shafts 3, 4, 5, and 6 geared up to a speed ratio of 1 to 2 by toothed wheels 7, 8, 9, 10, 11. Secured to the hub of a pulley, which is arranged on the main shaft 3, is one half of a coupling 12, the other half of which is arranged on a sprocket wheel 13 which is loose and axially movable on the shaft 3. The sprocket wheel 13 is connected by a chain 14 with a sprocket wheel 15 which is fast on the shaft 16 journaled in the opposite end of the machine frame. On the other end of the shaft 16 is a bevel wheel 17 engaging with a bevel wheel 22 secured to the extended shaft 18 of a conveyer worm 21 arranged in a casing 20, which is provided with a filling or charging hopper 19, and thereby driving the conveyer worm 21. The casing 20 is divided into two compartments A and B by a tongue shaped partition 23 formed in its front part. The two compartments communicate with one another in the center of the casing, and in the rear terminate in an extension of the compartment A. Secured to this hollow extension or cylinder is a mouthpiece 24 which is caused to taper to the rear by the provision of inwardly projecting step like parts 25. The rear end of the conveyer worm 21 which is arranged in the compartment A extends so far into the hollow cylinder that the mouthpiece 24 which is screwed or otherwise secured to the cylinder is partially closed by the last spire of the worm. In the compartment B which is limited at the rear by an oblique wall 26 of the casing and located in the central axis thereof which forms an acute angle with the main axis, is a second worm 27, carried by a shaft 28 which is rotatably journaled in a long hub 29 on the casing 20. The shaft 28 is provided with a toothed wheel 30 gearing with a toothed wheel 31 mounted on the shaft 18 of the conveyer worm 21. As the worm 27 is arranged at an acute angle to the conveyer 21 the spires of the two worms intercalate with one another in the opening through which the two compartments A and B communicate, where they roll and agitate the dough or mass, conveyed by the worms, in every direction, thereby thoroughly kneading and mixing the same.

By the engagement of the two conveyers 21 and 27 and by the resistance offered by the oblique wall 26 the dough is forced into the hollow cylinder which communicates with the compartment A from which the worm 21 forces it into the mouthpiece 24 and finally into the mold 32 attached thereto. Owing to the mouthpiece 24 tapering outwardly the dough is to a certain extent compressed therein, whereby any air that might still be present in the material is driven out.

The mold 32 is carried by a double armed bracket 33, Fig. 3, loosely journaled on a gland 34 which forms the bearing of the shaft 6, and connected by a rod 35 with a crank disk 36 mounted on the shaft 5, by which the arm 33, which carries the mold 32, is rocked at a determined time. Arranged in the mold 32 is a socket-like member 38 provided with an adjustable bottom 37 and capable of being adjusted in the mold 32 and of being connected to or disconnected from the bottom 37, whereby the space or cavity of the mold 32 both as regards width and depth can be varied, and consequently bodies of different sizes can be molded in one and the same machine.

The detachable connection of the socket 38 with the wall of the mold or with the bottom 37 is effected by a set screw 39 (Fig. 1) which projects through a hole 40 in the socket 38 and fits into a hole 41 in the bottom 37. If the socket 38 is fixed by the screw 39 (Fig. 4) so as to form a lining for the wall of the mold the capacity of the mold 32 is reduced by the thickness of the wall of the socket 38, and the bottom 37 will move in the socket 38. If, however, the bottom 37 is forced forward up to the forward edge of the socket 38 and coupled in this position with the socket 38 by the screw 39, the capacity of the mold on the return motion of both parts is enlarged by the double thickness of the wall of the socket 38 (Fig. 1). In the center of the bottom 37, is a recess 42 in which is fitted a valve 43 which is movable in the bottom 37, and is provided laterally with oblique passages 44, which communicate with the hollow rod 45 carrying the bottom 37. The rod 45 is guided in a tube 46 (Fig. 8) which is provided with holes 48 lying over holes 47 in the rod 45. The air which on the emptying of the mold enters the latter and is trapped therein can escape through the holes 48, and can therefore have no detrimental effect during the forcing in of the charge.

The piston rod 45 terminates at its free end in a flanged tubular enlargement 49, in which fits loosely a nut 50 which is prevented from dropping out by a gland 51, fastened by screws to the flange 49 of the piston rod 45, and which nut, at its outer end, is provided with a toothed rim 52. Engaging with the nut 50 is a flat threaded screw spindle 53 arranged within the hollow rod 45, and projecting slightly beyond the nut 50, and at its protruding end is shaped to form a head. The spindle 53 is provided with a long groove 54 with which engages a pin 55 screwed into the body of the hollow rod 45. The pin 55 during the displacement of the spindle 53 prevents the latter from rotating and also acts as a guide for it. The toothed part 52 of the nut 50 engages with a toothed wheel 57 mounted on a flat-threaded screw spindle 56, which is arranged parallel to the rod 45. The spindle 56 is rotatably journaled in bearings 58, 59, arranged on a sleeve or tube 46, arranged over the rod 45 and guided on a holder 60, connected to the bracket 33, which carries the mold 32. One of the bearings or carriers 58 is loose and movable on the sleeve 46, and is screw threaded to engage with the threads of the spindle 56. The latter is connected by bevel wheels 61, 62, with a shaft 65 journaled in a bearing bracket 64, which is secured upon the sleeve 46, and can be rotated by means of a hand wheel 63. During the rotation of the shaft 65 by the beveled gears 61 and 62 the spindle 56 will also be rotated, whereby, while on the one hand, the carrier 58, which is movable on the sleeve 46, will be horizontally displaced, on the other hand, the spindle 53, journaled in the nut 50, will be moved in horizontal direction.

Arranged on the bearings 58 and 64 are jaws 66, which are guided in a slide track 67 on the bracket 33, carrying the mold 32. Between the jaws 66 and secured on the projecting end of the shaft 6 is a crank disk 68, the pin 69 of which projects between the jaws 66 and, during the rotation of the crank disk 68, effects a displacement of the sleeve 46 together with the rod 45 and of the plunger 37. The screw spindle 53 which is journaled in the nut 50 is so moved that its head is caused to engage with a set screw 71, arranged on a weight actuated lever 70. By this means the movement of the plunger 37 is limited and the movement of the piston can be precisely adjusted in advance. The weight actuated lever 70 is secured to the protruding end of a shaft 73 rotatably journaled in posts 72, in other portions of which, and parallel to the shaft 73, is journaled a shaft 74, which carries a weight actuated lever 75.

Arranged on the shaft 73 is a cam 76, which, at a determined time, actuates a finger 77, fast on the shaft 74, thereby causing the latter to be moved inversely to the pressure of the counterweight of the lever 70. Arranged on one end of the shaft 74 is an arm 78, provided with a head in the form of a hook adapted to grip, at a given moment, behind the hooked end or head of a lever 79, which is arranged on the carrier 58, thereby holding the lever 79 in a locked position. The other end of the shaft 74 carries a cam 80 which, during the rotation of the shaft 74, acts upon a rod 83 which is under the influence of a spring 81, and is movable on a post 82. The wedge shaped end of the rod 83 engages with a slot 84 on a post 85, and holds a tooth 86, movably arranged in the latter, (Fig. 1). Above the rod 83, and rotatably journaled on the same post 82, is a long double armed lever 87, connected by a pin 89, which is guided in a slot 88, (Fig. 1), in the post 85, with the tooth 86. The upwardly turned end of the lever 87 is under the influence of a spring 90, attached to the machine frame and pulling the free end of the lever 87 (Figs. 1 and 3) to the front face of the toothed wheel 92, provided with a wedge shaped projection 91. The lever 87 is yieldingly connected by an intermediate member 93 (Figs. 1 and 2) with a forkshaped lever 95, capable of rocking about its fulcrum 94. Arranged on each of the two arms of the fork facing each other is a pin 96 (Fig. 3) which pins engage with an annular groove in the movable coupling portion 13, and at a given time throw the latter out of engagement with the other coupling portion 12, which is secured to the hub of the pulley, whereby the rotation of the sprocket 13 together with the sprocket wheel 15 is stopped and the worms 21, 27, are thrown out of action. The toothed wheel 8 on the shaft 4 (Fig. 1) is provided with a long hollow hub 97, in which is arranged a spring plate 98, which engages at a given moment in a slot 99, in a sleeve 100, secured on the shaft 4, and filling the cavity of the hub 97.

Guided respectively in each hub 101, 102, of the toothed wheels 10 and 11, is a short pin 103, 104, each of which is provided at its upper end with a roller 105. These rollers are positively guided in cam grooves 106, 107, in the machine frame while the other ends of the pins 103, 104, form locking dogs, which at a given moment snap into corresponding recesses in the shafts 5 and 6.

The described machine operates as follows: In filling the mold the working parts are in the position shown in the drawings. The material is charged through the hopper 19 into the casing 20, where it is conveyed into the mold 32 by the worm 21, driven from the gear wheel 11, through the sprocket wheels 13, 15, and the bevel wheels 17, 22. In the mold 32, the material is compressed to a predetermined extent, the parts 98, 103, 104 being released by the tooth 86, and cam grooves 106, 107, so that the remaining mechanism is at a standstill. As soon as the mass forced into the mold 32, overcomes the counter pressure of the weight actuated lever 70 the plunger 37, which forms the bottom of the mold 32, together with the hollow rod 45 is pressed back toward the rear, and the spindle 53 in the rod 45 strikes against the screw 71, arranged on the lever 70, and thereby raises the latter. The cam 76 on the shaft 73, rotated therewith then acts against the finger 77, of the shaft 74, and rotates the latter, whereby, in the first place, the locking connection of the arm 78, with the lever 79, secured to the carrier 58, is released, and, in the second place, the rod 83 is moved by the cam 80, and consequently the end of the rod is moved away from the tooth 86. At this moment the spring 90 draws the lever 87 against the front face of the toothed wheel 92. By this movement of the lever 87 the tooth 86 is drawn back into the post 85, and by the levers 93, 95, the movable part 13 of the coupling is disconnected from the fixed part 12, and at the same time the plate 98 is coupled with the sleeve 100. The gearing of the conveyer worms and the latter is now stopped, whereas the other gearing of the machine is set in motion. In this movement in the first place, the bracket 33, which carries the mold 32, is rocked by the action of the crank disk 36, and rod 35, so that the charged mold, 32, is moved downward, during which operation the mouth of the casing is closed by the upper arc shaped portion of the bracket 33. In the meantime the crank disk 68 has come into action, moving the sleeve 46, together with the rod 45, and the bottom 37 of the mold forward, thereby effecting the discharge of the molded mass from the mold. Thereupon the lever 33 is again raised by the crank disk 36 and rod 35, and, at the same time, the sleeve 46, together with the rod 45, and the bottom 37, are drawn back into the mold. In the meantime the toothed wheel 92 has made one revolution, and its wedge shaped projection 91 has forced the lever 87 away from the front face of the wheel 92. By this action the tooth 86 is again brought into the path of the plate 98, and at the same time the movable clutch portion 13 is coupled with the fixed portion 12, secured to the pulley so that the conveyer worms are again caused to rotate. The described operation is then repeated.

I claim:

1. A machine for treating and molding plastic masses comprising a mold, means for forcing plastic material into said mold, a movable mold bottom, an adjustable counterweight in connection with said bottom to allow a predetermined extent of compression in the mold, means operated by the counterweight device for stopping the supply of plastic material to the mold, means for removing the mold from the charging opening and means for discharging the molded mass, substantially as set forth.

2. A machine for treating and molding plastic masses, comprising a casing, two conveyer worms of different lengths therein, means for rotating said worms, a mouthpiece on said casing, an oscillating mold, a movable plunger forming the bottom of the mold, a rod connected to said plunger, a weight-actuated lever bearing against the end of said rod, lever mechanism intermediate the weight actuated lever and the driving mechanism, mechanism for oscillating the mold and stopping the rotation of the conveyer worms when the pressure in the mold exceeds a predetermined amount, and means for automatically discharging the molded mass, substantially as set forth.

3. A machine for treating and molding plastic masses, comprising a mold, means for forcing plastic material into said mold, a movable bottom in said mold, means for stopping the supply of material to the mold at a predetermined time, a plunger rod attached to the said bottom, a sleeve surrounding the plunger rod, a driven crank disk, adjustable jaws connecting said sleeve to the crank disk to advance the sleeve together with the rod and the movable bottom in the mold to discharge the latter, substantially as set forth.

4. A machine for treating and molding plastic masses comprising a mold, means for forcing plastic material into said mold, a movable plunger bottom in the said mold, a screw rod for said plunger bottom, a screw spindle parallel with said screw rod, a jaw mounted thereon, gear wheels connecting said screw spindle with the plunger rod and means for turning said screw rod and screw spindle simultaneously, substantially as set forth.

5. In a machine of the kind described, a mold, an adjustable lining for varying the diameter of said mold, an adjustable bottom in said lining, and means for adjusting the bottom in conjunction with or independently of the lining, substantially as set forth.

6. In a machine of the kind described, a mold, an adjustable bottom therein, passages in said bottom for the escape of air from the mold during the filling of the latter, and a movable vent valve at the face of said bottom, substantially as set forth.

7. A machine for treating and molding plastic material comprising a worm feed for the plastic material, a mold, a movable mold bottom, a tubular shaft attached to said bottom, a counterweight device adapted to be operated by the movement of the mold bottom, a clutch on the driving shaft, mechanism intermediate the clutch and the counterweight device for releasing the clutch connection and throwing the worm feed out of operation, and mechanism simultaneously operated by the counterweight device for rocking the mold away from the worm feed and discharging the molded material, substantially as set forth.

In testimony whereof I have signed my name to this specification in the presence of two subscribing witnesses.

ALFRED LUTZE.

Witnesses:
MORITZ SPREER,
RUDOLPH FRICKE.

---

Copies of this patent may be obtained for five cents each, by addressing the "Commissioner of Patents, Washington, D. C."